United States Patent
Land et al.

[15] 3,675,551
[45] July 11, 1972

[54] FILM STORAGE CHAMBER

[72] Inventors: Edwin H. Land, Cambridge; Irving Erlichman, Wayland, both of Mass.

[73] Assignee: Polaroid Corporation, Cambridge, Mass.

[22] Filed: May 11, 1970

[21] Appl. No.: 36,251

[52] U.S. Cl. .................................................. 95/11 R, 95/13
[51] Int. Cl. .................................. G03b 19/02, G03b 17/52
[58] Field of Search .................................. 95/11, 13, 30, 19

[56] References Cited

UNITED STATES PATENTS

| | | | |
|---|---|---|---|
| 1,557,085 | 10/1925 | Piller | 95/30 |
| 1,446,803 | 2/1923 | Ludowici | 95/30 |
| 1,469,273 | 10/1923 | Kauser | 95/30 |
| 1,613,378 | 1/1927 | Boniforti | 95/30 |
| 2,463,878 | 3/1949 | Johnson | 95/30 X |

*Primary Examiner*—John M. Horan
*Assistant Examiner*—Kenneth C. Hutchison
*Attorney*—Brown and Mikulka and Alfred E. Corrigan

[57] ABSTRACT

A camera having a variable volume film storage chamber which is generated from within the confines of the camera by moving sections of the camera into a position wherein film units can be sequentially exposed, processed and individually viewed between exposures. The storage chamber is defined in part by a wall of the camera which is adapted to be moved away from the remainder of the camera. In the case of a folding type camera, one end of an erecting link functions as a cam to engage a cam follower on the movable wall to move the wall away from the remainder of the camera as the erecting link guides sections of the camera into an extended, operative position. In the case of a non-folding type of camera, a manually operated button is actuated to move a plurality of cams in a direction to move a wall of the camera away from the remainder of the camera to generate the storage chamber and to make the camera fully operative. In both types of cameras, springs are connected between the movable wall and the remainder of the camera for moving the wall toward the remainder of the camera when the user folds the folding type camera or when he again actuates the aforementioned button on the non-folding type of camera. Movement of the wall toward the remainder of the camera is limited only by the thickness of the stack of exposed film units contained therein, thereby minimizing the compactness of the camera when in the non-operative position.

28 Claims, 13 Drawing Figures

PATENTED JUL 11 1972

INVENTORS
EDWIN H. LAND
IRVING ERLICHMAN
BY Brown and Mikulka
and
Alfred E. Corrigan
ATTORNEYS

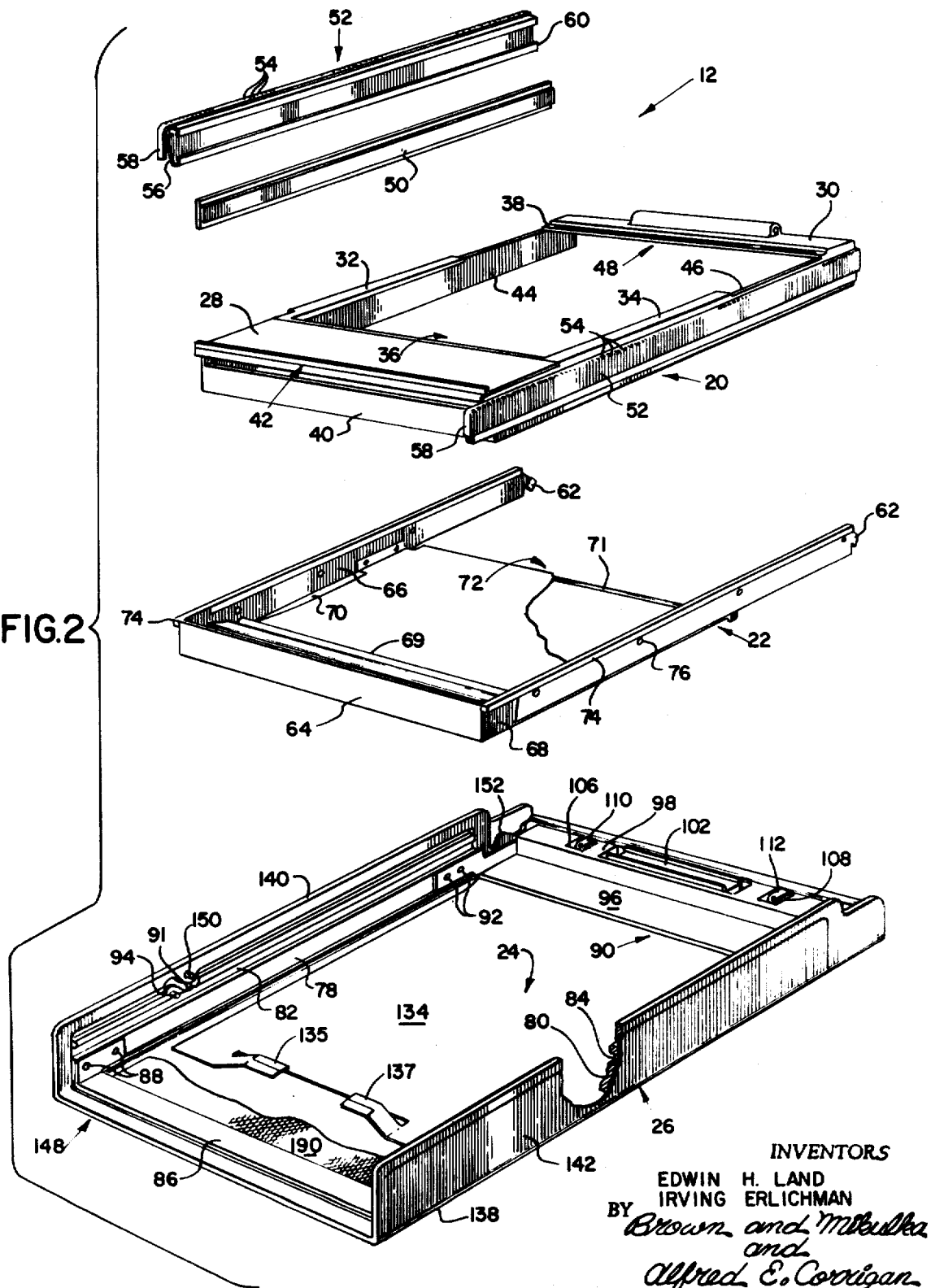

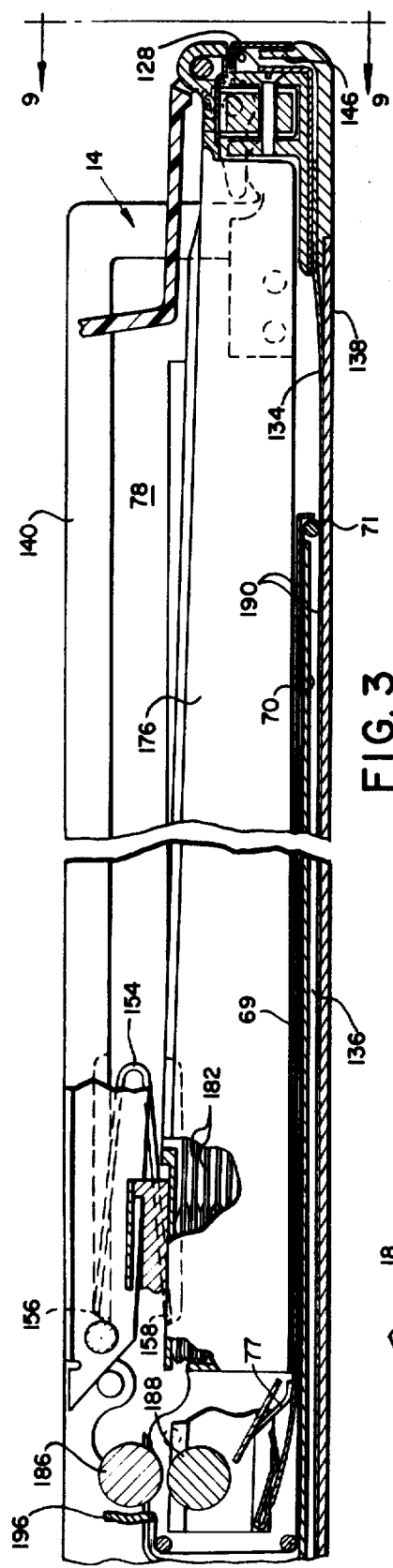
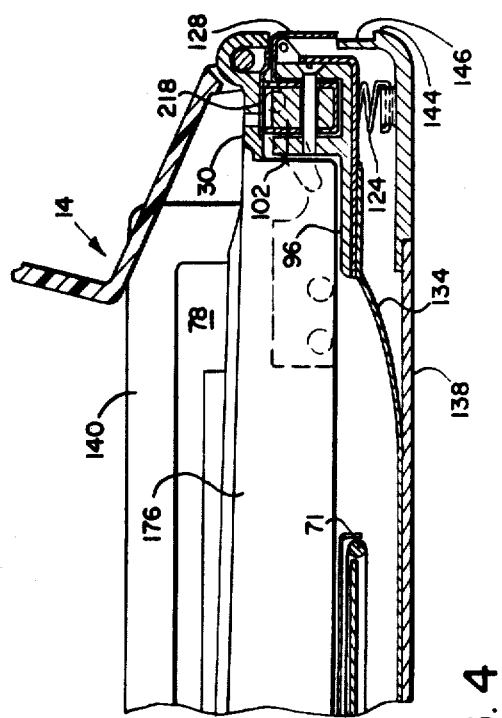
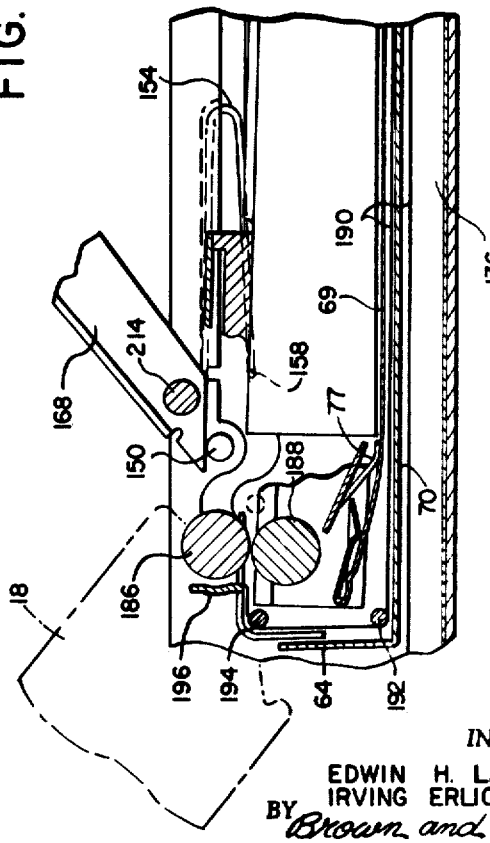
FIG. 3
FIG. 4
INVENTORS
EDWIN H. LAND
IRVING ERLICHMAN
BY *Brown and Mikulka*
and
*Alfred E. Corrigan*
ATTORNEYS

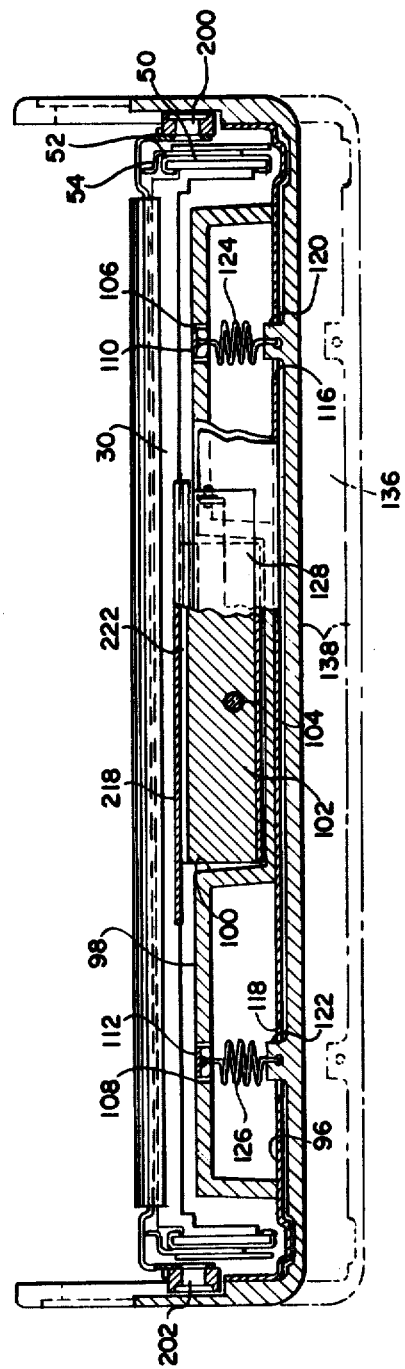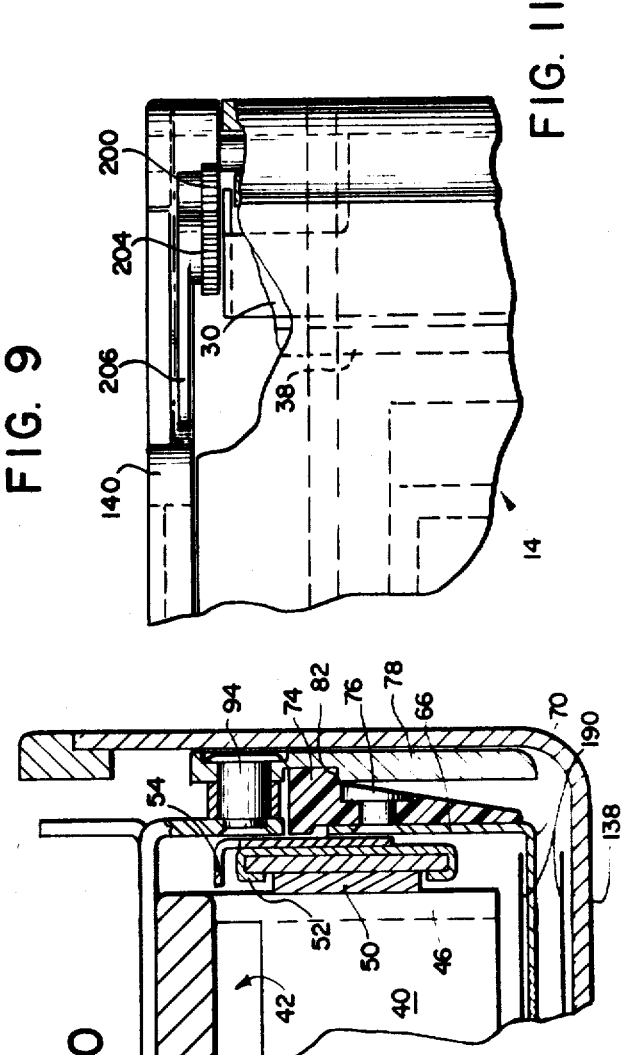

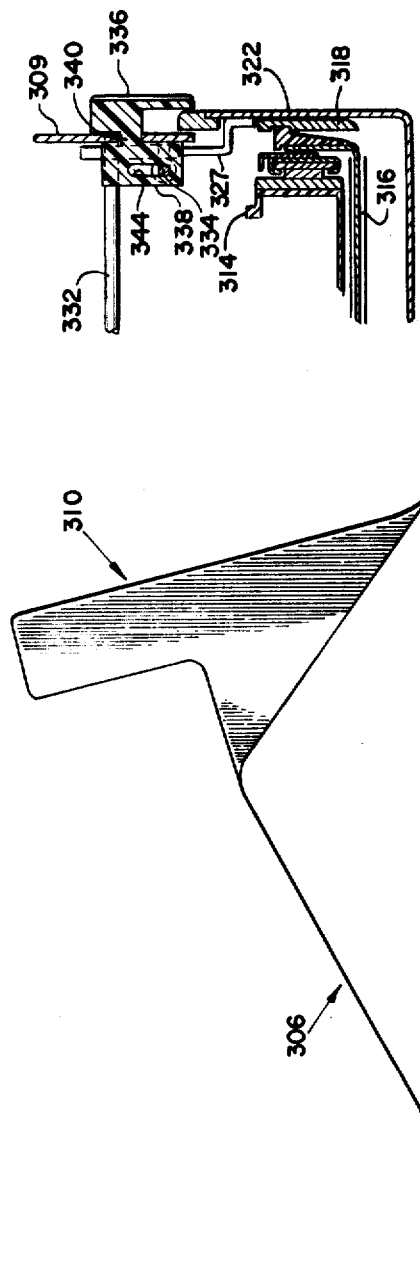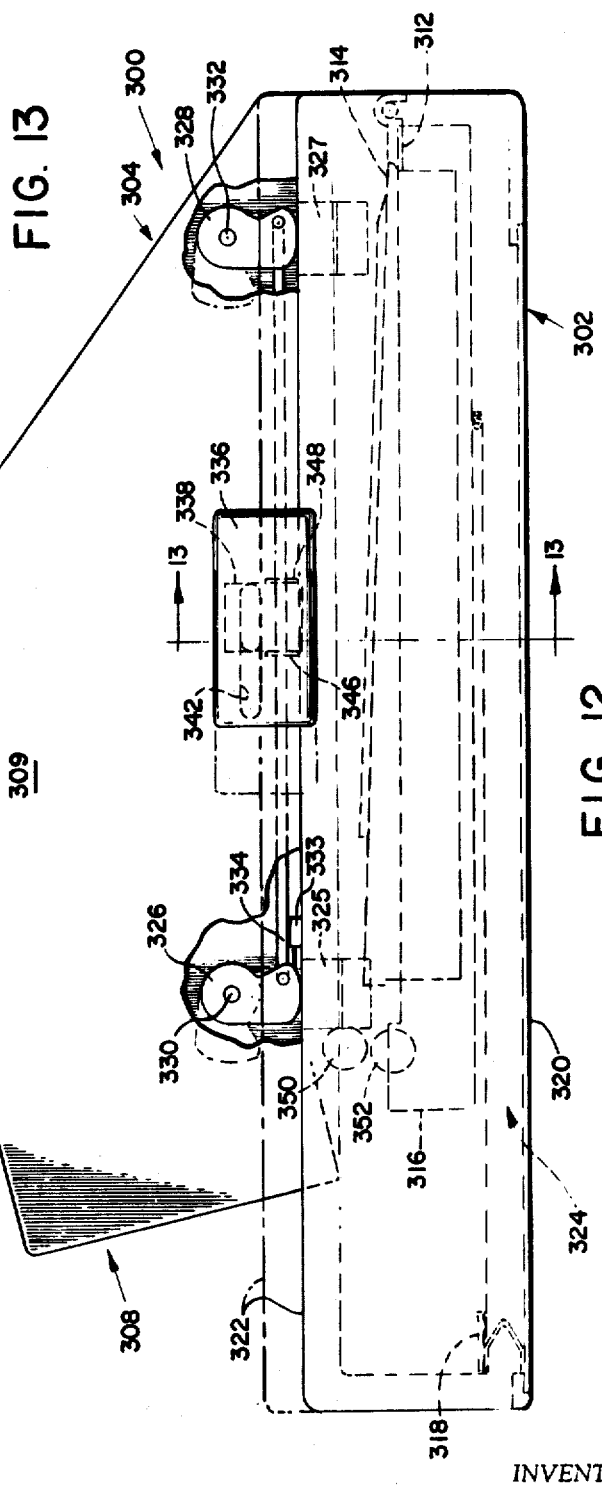

FILM STORAGE CHAMBER

BACKGROUND OF THE INVENTION

1. Field of the Invention

The present invention relates to photographic apparatus, e.g., self-developing cameras, of the type which are adapted to sequentially expose and process photosensitive elements and, more particularly, to a variable volume storage chamber for housing the exposed photosensitive elements.

The self-developing camera with which the present invention is concerned is adapted for use with a film unit including a photosensitive element of the type described in U.S. Pat. No. 3,415,644, granted to Edwin H. Land on Dec. 10, 1968, and assigned to the same assignee as the present invention. In film units of this type a photosensitive element is positioned in face-to-face relationship with a transparent element and bound together to form a film unit. The film unit is located in position for exposure within the camera and the photosensitive element exposed through a transparent element. A processing composition is contained in at least one pod situated at one end of the face-to-face elements. After exposure of the photosensitive element, the processing composition is spread between the elements to initiate a diffusion transfer process. The photosensitive element is then moved to a storage chamber from which it may be removed, viewed and returned to the storage chamber. However, providing a camera with a storage chamber will usually result in an increase in the overall size or volume of the camera. Increasing the overall volume of a camera places it at a competitive disadvantage relative to other cameras since the compactness of a camera usually enhances its useability. Therefore, not only is there a need for providing a camera of the self-developing type with a storage chamber for receiving exposed film units but, the volume of the storage chamber must be generated from within the camera such that the volume of the storage chamber is at a maximum when in use and is at a minimum when not in use so as not to detract from the compactness of the camera while it is being carried by the user.

2. Description of the Prior Art

In U.S. Pat. No. 2,467,320, there is disclosed a self-developing camera having a collapsible chamber mounted on external portions of the camera. The chamber is adapted to receive and store film units subsequent to exposure thereof. In use, the chamber is pivoted from a stored position in front of the camera's lens to a position in line with the path of movement of a film unit as it exits from the camera. Although a high degree of compactness is obtained with this structure the storage chamber nevertheless, adds to the total volume of the camera even when the camera is in the collapsed position.

SUMMARY OF THE INVENTION

The invention relates to photographic apparatus, e.g., cameras of the self-developing type wherein a plurality of photosensitive elements are adapted to be exposed and processed. A storage chamber is provided for housing the photosensitive elements subsequent to exposure. The storage chamber is generated by increasing the volume of the camera prior to exposing one of the photosensitive elements. In a preferred embodiment of the invention the storage chamber forms a part of an extensible type camera. The storage chamber is generated by moving the rear wall of the camera relative to the remainder of the camera by cams and cam followers as sections of the camera are moved between a stored configuration and an erected configuration. Resilient members in the form of springs bias the rear wall toward the remainder of the camera such that the volume of the storage chamber can be reduced to that which is just sufficient to house the precise number of exposed photosensitive elements contained therein. In an alternative embodiment the storage chamber is part of a rigid, non-collapsible type camera and the storage chamber is manually erected prior to actuating the camera's shutter.

Accordingly, an object of the invention is to provide in photographic apparatus of the type including a support member for locating photosensitive elements in position for exposure, means for generating a storage chamber for receiving the exposed photosensitive elements.

Another object of the invention is to provide in photographic apparatus of the type described, means for reducing the volume of the storage chamber, when the apparatus is not in use, to that which is just sufficient to house the precise number of exposed photosensitive elements contained therein.

Another object of the invention is to provide in photographic apparatus of the type including a plurality of sections coupled for movement between a stored configuration and an erected configuration and a variable volume storage chamber for housing exposed photosensitive elements, means for automatically generating the storage chamber as the sections move from the stored configuration to the erected configuration.

Another object of the invention is to provide in photographic apparatus of the type including support means for locating a photosensitive element in position for exposure and a variable volume storage chamber for housing the exposed photosensitive elements, means for transporting the exposed photosensitive elements from the exposure position to the storage chamber.

Another object of the invention is to provide in a camera of the non-extensible type including means for generating a variable volume storage chamber for receiving exposed photosensitive elements, means for insuring that the storage chamber has been generated prior to moving a photosensitive element into it.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 2 is an exploded perspective view, partly in section, of one of the sections of the camera shown in FIG. 1;

FIG. 3 is an elevation view, partly in section, of a portion of the camera shown in the stored, inoperative position;

FIG. 4 is a view similar to FIG. 3 showing sections of the camera in a position intermediate the stored, inoperative position and the erected, operative position;

FIG. 9 is a view, partly in section, looking in the direction of arrows 9—9 in FIG. 3;

FIG. 10 is an elevation view, partly in section, of a pivotal connection between the camera's film loading door and a film support member;

FIG. 11 is a fragmentary elevation view, partly in section, of one corner of the camera;

FIG. 12 is an elevation view, partly in section, of a non-extensible type camera having a variable volume storage chamber; and FIG. 13 is a view taken along the line 13—13 of FIG. 12 showing a storage chamber in an erected position.

DETAILED DESCRIPTION OF THE INVENTION

Figure 1:
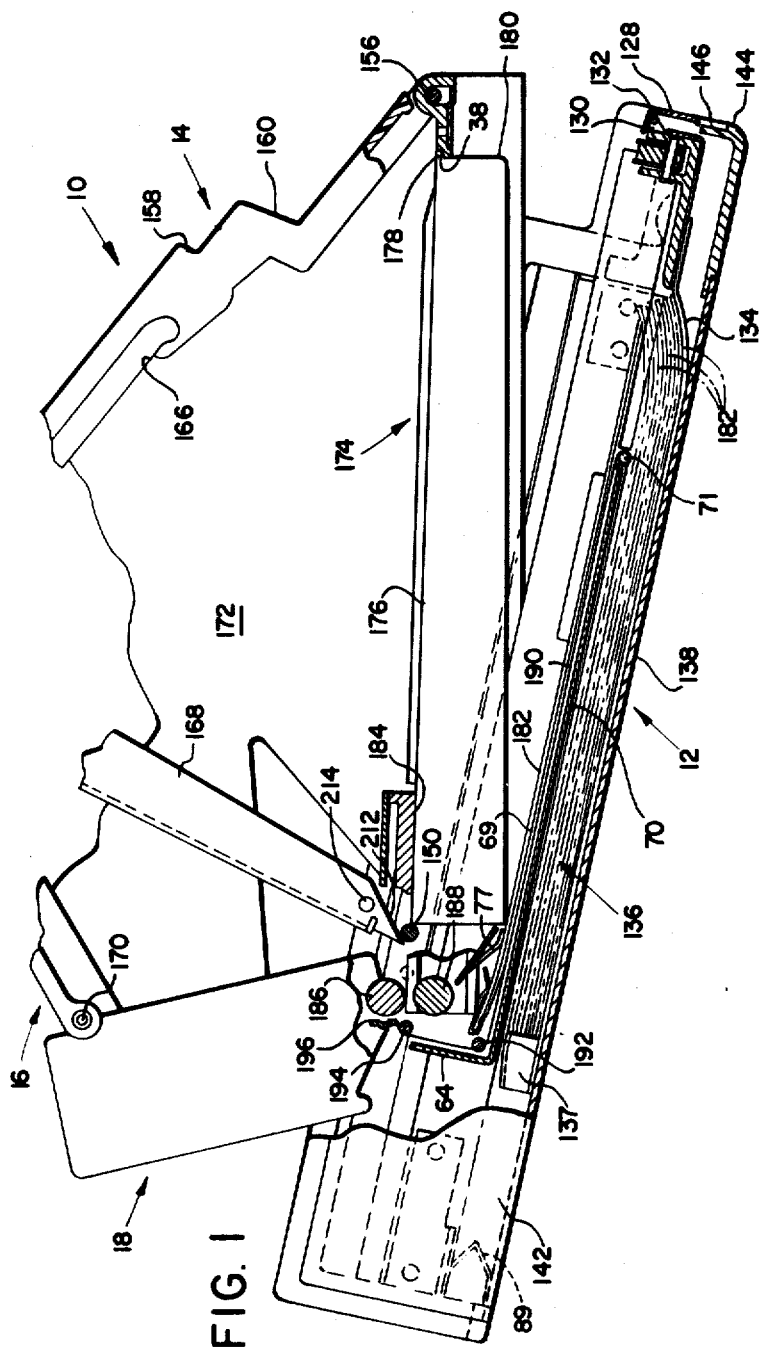
FIG. 1 is an elevation view, partly in section, of an extensible type camera shown in its erected, operative position with its film loading door in the open or loading position.
Figure 8:
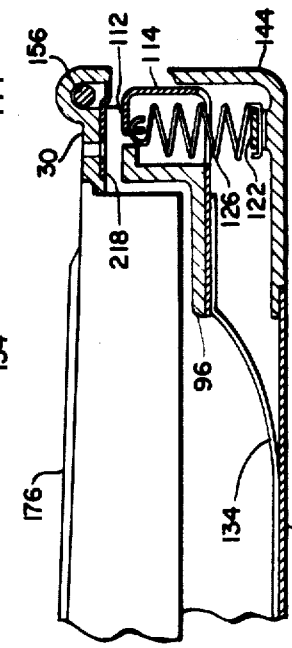
FIGS. 7 and 8 are elevation views, partly in section, of one end of the camera showing a resilient connection between one of the sections of the camera and its film loading door.
Figure 7:
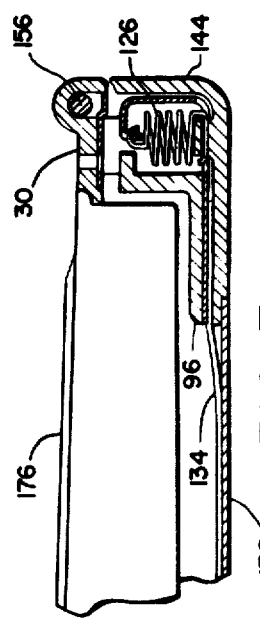

Reference is now made to FIG. 1 of the drawings wherein is illustrated a camera 10 of the extensible type. Camera 10 includes a plurality of sections 12, 14, 16 and 18 pivotally coupled to each other for movement between the erected, operative position (except for the film loading door being open) shown in FIGS. 1 and 6, and the stored, inoperative position shown in FIGS. 3 and 5.

Referring to FIG. 2 it can be seen that section 12 is comprised of a plurality of members including an inner frame member 20 for supporting a container of film units in position for exposure, the contacting surfaces of the film container and inner frame member forming a lighttight seal; a drawer 22 adapted to receive a film unit subsequent to exposure thereof and transfer the film unit to a storage chamber within the camera; and an outer frame member 24 which cooperates with drawer 22 to guide it in a reciprocating manner and further cooperates with a bottom cover member or closure member 26 to define a film storage chamber as will be more fully explained hereinafter. Because of space limitations in the drawing of FIG. 2, outer frame member 24 and closure member 26 are not shown in an exploded relation but rather in the positions they occupy relative to each other when the camera is in the stored, inoperative position.

Inner frame member 20 includes a forward wall comprised of sections 28, 30, 32 and 34 which cooperate to define an exposure opening 36. Wall portion 28 encloses means (not shown) for entering a film container and moving a film unit therefrom subsequent to exposure of the latter in a manner similar to that disclosed in the copending application of Irving Erlichman, Ser. No. 179, filed Jan. 2, 1970, entitled Photographic Apparatus, and assigned to the same assignee as the instant application. Wall portion 30 includes a recess 38 for receiving a lip on the film container for supporting the latter, while wall portions 32 and 34 restrict the upward movement of the film container relative to the inner frame member and assist in locating the forwardmost film unit in position for exposure. Inner frame member 20 further includes a leading end wall 40 having an elongated opening 42 therein dimensioned to allow passage of a film unit therethrough and side walls 44 and 46. The trailing end of inner frame member 20 is provided with an opening 48 which facilitates the insertion of a film container into position within inner frame member 20. Fixedly mounted on each side wall 44 and 46 is an elongated rack support member 50 having a T-shaped configuration in cross section for receiving and slidably supporting a generally U-shaped rack 52. Each rack 52 includes a plurality of apertures 54 therein for receiving the teeth of a sprocket for moving the racks in a reciprocating manner. One end 56 of the rack is provided with a downwardly turned member 58 which is adapted to engage the rearwardly facing surface (to the right as viewed in FIG. 2) of the leading end wall 64 of the drawer 22 for moving the drawer 22 outwardly, i.e., to the left as seen in FIG. 1, and an end 60 which is adapted to engage means 62 on the drawer 22 for moving the latter to the right as seen in FIG. 1.

Drawer 22 includes a leading end wall 64, side walls 66 and 68 and a rear wall 70. Rear wall 70 is terminated at its trailing end by a roller 71 rotatably mounted intermediate the ends of walls 66 and 68 in order to facilitate movement of a curtain thereover as will be explained shortly and a resilient spring clip 69 which is adapted to grip the leading end of a film unit. An elongated bearing member 74 is mounted on each side wall 66 and 68 by suitable means such as rivets 76.

Outer frame member 24 includes a pair of side walls 78 and 80 having recessed guides 82 and 84 therein for slidably receiving the bearing members 74. The leading ends of side walls 78 and 80 are attached to a member 86 by rivets 88. The trailing ends of side walls 78 and 80 are connected to a support member 90 by rivets 92. Each of the side walls 78 and 80 further includes a recess 91 for receiving a cam follower as will be explained hereinafter and a pivot pin 94 about which closure member 26, outer frame member 24 and drawer 22 pivot as a unit to the open position shown in FIG. 1. Support member 90 includes a first portion 96 adapted to receive one end of inner frame member 20 and a second raised portion 98 which is adapted to support a closure means in the form of a magnet 102. Second portion 98 includes an elongated recessed section 100 in which is mounted magnet 102 by suitable means such as a screw 104 (see FIG. 5). Second portion 98 further includes apertures 106 and 108 which are adapted to receive lugs 110 and 112 extending from the trailing end wall 114 of outer frame member 24. A second pair of apertures 116 and 118 (see FIG. 9) are located in support member 90 in alignment with apertures 106 and 108. In the stored, inoperative position of the camera, a second pair of lugs 120 and 122, integral with closure member 26, extend through apertures 116 and 118, respectively. Lugs 110, 112, 120 and 122 are adapted to mount a pair of tension springs 124 and 126 for resiliently urging closure member 26 toward outer frame member 24. A lever 128 is pivotally mounted to second portion 98 by flanges 130 and pins 132 (only one of each being shown). Lever 128 is adapted to be actuated in a clockwise manner by the user of the camera to break the magnet coupling between the magnet 102 and the inner frame member 20 as will be more clearly explained hereinafter. A resilient plate 134 is connected at its trailing end to the underside of first portion 96 and includes a pair of upwardly projecting resilient stop members 135 and 137. As can be seen in FIGS. 1 and 2, the bias of plate 134 is such that the greater portion of the plate remains in contact with closure member 26 in all positions of the camera. Plate 134, in cooperation with closure member 26, outer frame member 24 and drawer 22, defines a storage chamber 136 having a variable volume for storing film units subsequent to exposure.

Closure member 26 includes a generally rectangularly shaped rear wall 138, a pair of upstanding side walls 140 and 142, a trailing end wall 144 having a section 146 of reduced thickness and an open leading end 148. As can be seen in FIG. 2, outer frame member 24 is adapted to be positioned within closure member 26. Cam followers 150 (only one of which is shown), having a common axis, are mounted on each side wall 140 and 142 and are adapted to be moved into recesses 91 in side walls 78 and 80. A second set of cam followers 152 (only one of which is shown) extends from side walls 140 and 142. Spring means 154 (see FIGS. 3 and 4) has one of its ends 156 suitably attached to side wall 140 of closure member 26 and its other end 158 connected to inner frame member 20 for resiliently urging closure member 26 toward outer frame member 24.

Figure 5:
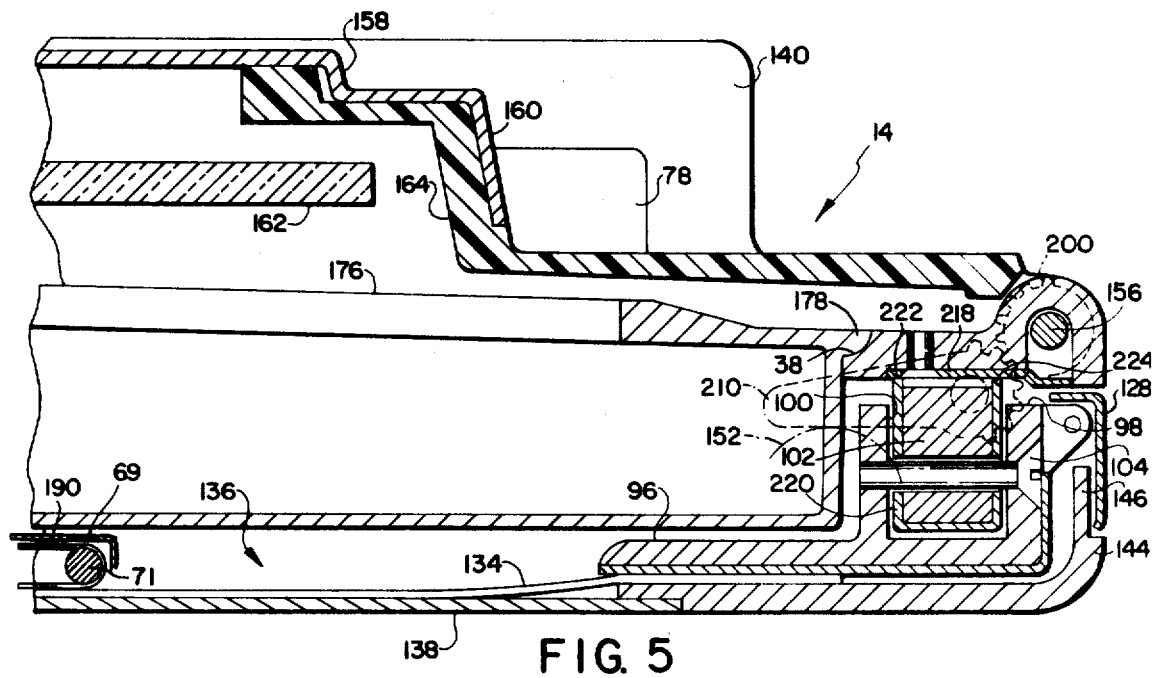
FIG. 5 is an enlarged elevation view, partly in section, of one end of the camera, the camera being shown in the stored, inoperative position.
Figure 6:
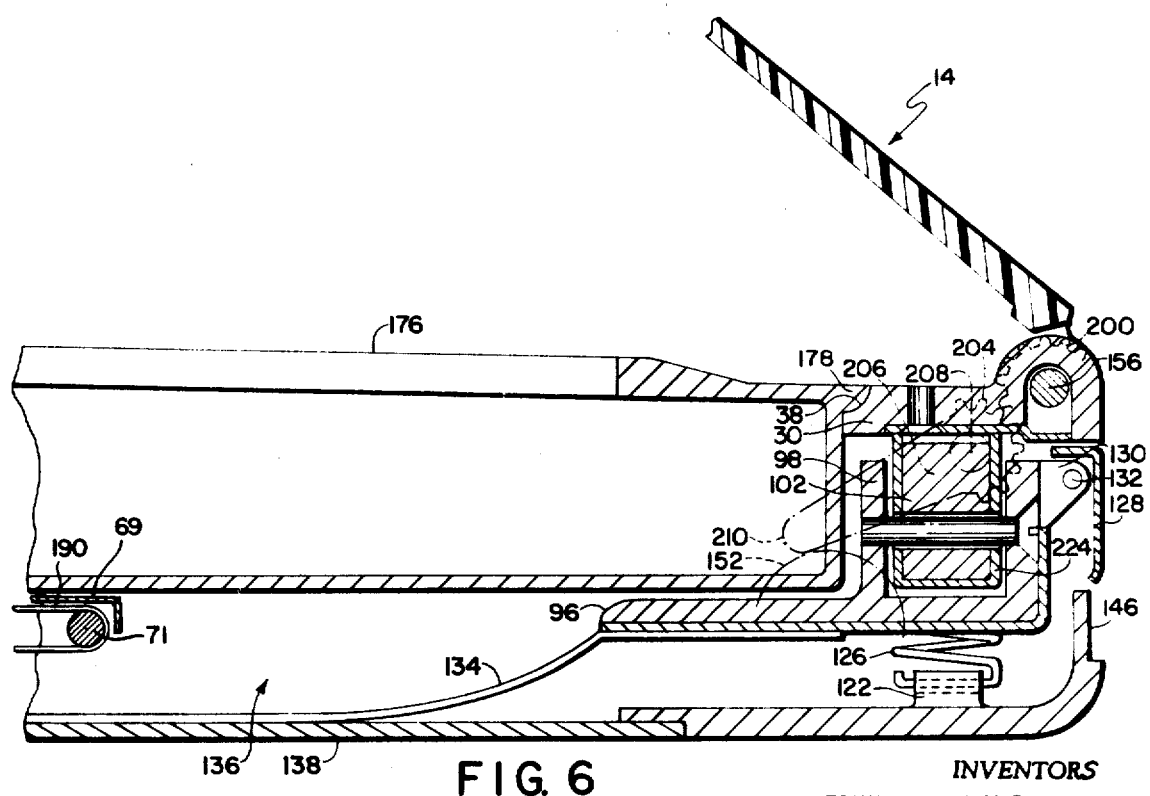
FIG. 6 is a view similar to FIG. 5 showing sections of the camera in the erected, operative position.

Section 14, which may be considered as a connecting link between sections 12 and 16, is pivotally coupled to inner frame member 20 about pivot pin 156 for movement between the stored, inoperative position shown in FIG. 5 and the erected, operative position shown in FIG. 6. Section 14 further includes a pair of recesses 158 and 160 for receiving a rangefinder-viewfinder (not shown) when in the stored position. A component of the camera's exposure system, i.e., a reflecting surface or mirror 162, is mounted on the interior surface 164 of section 14 by any suitable means. Each side of section 14 has a slot 166 therein which is adapted to receive a pin mounted on an erecting link 168 for guiding the sections 12, 14, 16 and 18 between the stored and erected positions.

Section 18 is pivotally coupled to inner frame member 20 at one end and has its other end pivotally coupled to section 16 about hinge 170. Section 16 is in turn pivotally coupled to section 14 to complete the interconnection between the sections 12, 14, 16 and 18. Section 18 houses the camera's lens and shutter assembly as well as various other parts of the camera including a motor for operating various components of the camera. A flexible bellows 172 is attached to sections 12, 14 and 18 to provide a lighttight path between the camera's lens and shutter assembly and the photosensitive element located in position for exposure within film container 38. For a more detailed description of sections 14, 16 and 18 reference is made to the copending application of Lawrence M. Douglas entitled Camera Latch, Ser. No. 885,420, filed Dec. 16, 1969, and assigned to the same assignee as the instant application.

Positioned within and supported by inner frame member 20 is a film assemblage 174 of the type shown in the copending application of Irving Erlichman entitled Film Container, application, Ser. No. 13,623, filed Feb. 24, 1970 and assigned to the same assignee as the instant application. Film assemblage 174 includes a container 176 having a lip 178 located near its trailing end 180 which is adapted to be received by recess 38 in inner frame member 20 for supporting the trailing end of the film container in position for exposure of the forwardmost film unit located within the container. Any suitable means may be provided for supporting the remainder of the film container in the position shown in solid lines in FIG. 1, e.g., rails and grooves as taught in said copending application, Ser. No. 13,623.

Positioned within the container 176 are a plurality of film units 182 of the type shown and described in the aforementioned U.S. Pat. No. 3,415,644, granted to Edwin H. Land and assigned to the assignee of the instant application. Film units 182 are adapted to be processed by moving them subsequent to exposure, from a first position, i.e., their exposure position which lies generally in a plane containing an interior surface 184 of inner support member 20, into the bite of a pair of pressure-applying members, e.g., rolls 186 and 188, which are adapted to spread a processing agent between elements of the film unit to initiate a diffusion transfer process which ultimately results in a viewable image as described in said patent. After the film unit has passed from between the rolls 186 and 188 it is moved to a second position within the camera wherein it is available for viewing by the user prior to being moved into storage chamber 136.

A curtain 190 made from any suitable opaque material is mounted between rolls 186 and 188 and outer frame member 24 in order to provide a lighttight environment for the exposed film unit as it is moved between the exposure position and the viewing position. Curtain 190, which is of a fixed length, has one of its terminal ends secured to the underside of member 86 (see FIG. 2). The curtain extends rearwardly (to the right as viewed in FIG. 1) over stop members 135 and 137 to a point whereat it reverses its direction around roll 71. From roll 71 the curtain extends to the left until it reaches a roll 192 rotatably mounted within drawer 22. The curtain then extends around roll 192 upwardly and over a second roll 194, rotatably mounted on drawer 22 and finally has its other terminal end secured to part of the fixed camera structure at 196.

As the sections of the camera move between the stored, inoperative position shown in FIG. 5 to the erected, operative position shown in FIG. 6 a storage chamber 136 of variable volume is generated. The structure for accomplishing this includes a pair of sector gears 200 (only one of which is shown) mounted on opposite sides of pin 156 for rotation about their axis as section 14 moves between the stored and erected positions. Each sector gear 200 is in mesh with a second sector gear 204 mounted on the end of a link 206 pivotally mounted at 208 on a fixed portion of the camera's structure. The other end of each link 206 has a cam surface 210 which is adapted to engage a cam follower 152 located on each side of closure member 26. As can be seen in FIGS. 5 and 6, when section 14 moves to the erected position links 206 rotate in a counter-clockwise manner to move cam followers 152 and closure member 26 away from outer frame member 24 thereby increasing the volume of storage chamber 136 until it reaches its maximum volume when the camera is in its erected, operative position as shown in FIG. 6. A second set of cam surfaces 212 (only one of which is shown) located on the lower end of each erecting link 168 are provided for engaging cam followers 150 attached to side walls 140 and 142 of closure member 26 for moving closure member 26 away from outer frame member 24 as erecting links 168 pivot about hinge 214 in a counter-clockwise manner.

As the sections of the camera move from the erected position to the stored position, cams 210 and 212 will try to move out of engagement with their respective cam followers. However, springs 124, 126 and 154 will urge the cam followers into contact with their respective cams until such time that the thickness of one or more film units located within storage chamber 136 prevents closure member 26 from moving any closer to outer frame member 24. This cooperation between the cams, cam followers and springs enables the volume of the camera in the compact position to be kept to a minimum, the minimum volume being directly related to the number of film units located within the storage chamber 136. In other words, as the camera is moved into the stored position, the volume of storage chamber 136 will automatically be reduced to one which is just sufficient to hold the precise number of film units located within the chamber, thereby keeping the volume of the entire camera to a minimum when the camera is in the stored position.

Cameras of the type so far described, are susceptible to damage during the film loading process because of the close proximity of one or more of the camera's exposure components to the chamber which receives the film container 176. The reason for this is that cameras of the extensible type are usually capable of being loaded while the camera is in the stored, inoperative position. As can be seen in FIG. 5, one of the components of the camera's exposure system, i.e., reflecting surface or mirror 162, is located closely adjacent the area which is adapted to receive the film container 176. If a film container were to be loaded into position within inner frame member 20 while the camera is in the stored position shown in FIG. 5, there is a possibility that the film container will strike mirror 162 and either damage it or cause misalignment of the mirror. Further, because of the compactness of cameras of this type, they are quite often carried in the user's pocket or handbag wherein the camera's loading door latch is subject to accidental actuation, thereby allowing the film loading door to partially open and possibly dislodge the film container and prematurely expose the film units contained therein. Provision is made in the instant camera to ensure that components of the camera's exposure system, which ordinarily lie in a position near the camera's structure which is adapted to support the film container when the camera is in the stored position, are moved to a position away from said structure as the camera is moved into the erected position before the film loading door can be opened. As can be seen in FIGS. 5 and 6, closure member 26 is coupled to inner support member 20 by the magnetic attraction between magnet 102 and a metallic plate 218 mounted on the underside of inner frame member 20. Magnet 102 is partially encompassed by a metallic plate 220 for forming a horseshoe type magnet having its poles at 222 and 224. Poles 222 and 224 space the magnet 102 away from plate 218 so as to create a magnetic field therebetween. A lever 128 is provided for breaking the magnetic coupling between magnet 102 and plate 218 to allow closure member 26, outer frame member 24, and drawer 22 to move as a unit to the film loading position shown in FIG. 1. However, as will be noted in FIG. 5, a portion 146 of rear wall 144 is located in a position adjacent lever 128, such that actuation of lever 128 when the camera is in the stored position is prevented by the interference of detent or portion 146. As the camera moves from the stored position of FIG. 5 to the erected position of FIG. 6, closure member 26 is moved away from outer frame member 24 as previously described. As closure member 26 moves away from outer frame member 24, detent 146 is withdrawn from its position in interference with lever 128 to a position which enables actuation of lever 128 to break the magnetic coupling and move closure member 26, frame member 24, and drawer 22 to the position shown in FIG. 1. In this position, i.e., the erected position, the mirror 162 has been moved away from inner frame member 20, thereby reducing the possibility of accidentally striking the mirror 162 upon inserting an object through the opening normally occupied by the closure member.

OPERATION

When it is desired to load a film assemblage 174 into the camera of the present invention, the camera as shown in FIG. 5 is erected or extended so that it assumes the configuration shown in FIG. 6. As the camera moves between the stored position of FIG. 5 and the erected position of FIG. 6 cam surfaces 210 and 212 move cam followers 152 and 150 downwardly to space closure member 26 from outer frame member 24 to generate a storage chamber 136. As closure member 26 moves away from outer frame member 24 detent 146 mounted on trailing end wall 144 of closure member 26 moves out of its position in interference with lever 128 to a position wherein lever 128 is capable of actuation. Actuation of lever 128 breaks the magnetic coupling between magnet 102 and plate 218 to allow closure member 26, outer frame member 24, and drawer 22 to pivot about the axis of pivot pin 94 to the open or loading position shown in FIG. 1. Any film units which may be located in storage chamber 136 or in drawer 22 are removed at this time along with the empty film container 176. After inserting a new film assemblage 174 into position within inner frame member 20, closure door 26, outer frame member 24, and drawer 22 are moved as a unit to their closed position shown in FIG. 5. The next step is to actuate the camera's shutter button to actuate a circuit for controlling operation of the shutter, rolls 186 and 188 and the film advancing apparatus of the camera to move a dark slide located between the forwardmost film unit 182 in container 176 and the forward wall 184 into the bite of rolls 186 and 188. The power for energizing the circuit may be supplied by one or more batteries located within the film container or within the camera. Simultaneous with the operation of the film advancing apparatus, sprocket gears having their teeth in mesh with apertures 54 in racks 52 are rotated in such a direction as to advance drawer 22 to the left as viewed in FIG. 1. The ratio between the gearing for driving the rolls 186 and 188 and the drawer 22 is such that the rolls 186 and 188 will advance the dark slide to the left at a faster rate than the drawer is moving to the left. Before drawer 22 reaches its furthermost travel to the left the leading end of the dark slide has advanced to a position wherein it is grasped by the resilient spring clip 69 mounted on rear wall 70 of drawer 22. Further leftward movement of the drawer removes the trailing end of the dark slide from between rolls 186 and 188. The construction of spring clip 69 is such as to move the trailing end of the dark slide downwardly to a level below roll 188. At this time means (not shown) are provided for reversing the drive of the sprocket which is engaged with racks 52 to reverse the direction of drawer 22, i.e., to move the drawer 22 to the right as viewed in FIG. 1. As drawer 22 moves to the right the dark slide is moved beneath roll 188 where it lies on top of spring clip 69 and the circuit to the camera's motor is opened to complete the operating cycle.

The camera is now ready for exposure of the forwardmost film unit 182 located within film container 176. Actuation of the shutter's release will simultaneously actuate the shutter to expose the forwardmost film unit and energize the drives to the film advancing means, rolls 186 and 188, and the pinion drive for drawer 22. Again, drawer 22 reciprocates in the same manner as previously described. Note; at the time drawer 22 starts its movement to the left the dark slide is still located on spring clip 69 within drawer 22. Suitable means, e.g., spring 77 is provided for removing the dark slide from the bite of spring clip 69 as the drawer 22 moves to the left thereby preventing the dark slide from moving with the drawer to the left. The exposed film unit passes between the rolls 186 and 188 which distribute a processing agent between elements of the film unit for initiating development thereof. Just prior to the drawer reaching its limit of travel to the left, the leading edge of the film unit catches up with and enters the bite of spring clip 69. Spring clip 69 grips the film unit's leading edge until the film unit's trailing edge has passed from between the rolls 186 and 188. During this time the bottom wall 70 of drawer 22 and spring clip 69 have passed from beneath the dark slide thereby enabling the dark slide to fall into the storage chamber 136 under the influence of spring 77. When drawer 22 reaches the extent of its leftward travel the sprocket drive to racks 52 is again reversed to move the drawer 22 to the right. As with the dark slide, the exposed film unit moves beneath rolls 188 as the drawer 22 returns to its original position, i.e., with the leading end wall 64 of drawer 22 located closely adjacent the rolls 186 and 188. At this time, should the user of the camera desire to view the processed film unit he may now actuate lever 128 to move closure member 26, outer frame member 24, and drawer 22 to the position shown in FIG. 1. Since the film unit at this time is now located within drawer 22 with the exposed image facing upwardly the user may simply view the film unit in place or remove the film unit, examine it and return it to its position within drawer 22. After viewing the exposed film unit, closure member 26 is then moved together with outer frame member 24 and drawer 22 to the closed position and the next succeeding film unit 182 within the film container 176 may be exposed. As the succeeding film units are sequentially exposed and moved from their exposure position to the left into the drawer 22 and then to a second viewing position wherein the film unit is located within the drawer 22, the preceding film unit has dropped into the storage chamber 136. Stop members 135 and 137 located near one end of the storage chamber prevent the film units located within the storage chamber 136 from being moved to the left due to the frictional engagement between the uppermost film unit located within the storage chamber and the curtain 190 as the drawer 22 moves to the left. Further, a flexible, opaque sheet 89 is mounted between closure member 26 and member 86 to prevent the admission of actinic light into the storage chamber 136. If at any time between exposures the user of the camera desires to view one of the film units located within the storage chamber 136 he merely has to actuate lever 128 to move closure member 26, outer frame member 24 and drawer 22 to the position shown in FIG. 1. The user may then remove the film unit from exposure chamber, view it and return it to the storage chamber. If, after taking a number of exposures less than the number of film units originally contained within film container 176, the user decides to move the sections of the camera into the stored, inoperative position, storage chamber 136 will reduce its volume to one which is just sufficient to contain the number of film units located therein as previously explained, thereby keeping the overall volume of the camera to a minimum.

An alternative embodiment of the invention is shown in FIG. 12. Herein a camera 300 of the non-extensible or non-folding type is shown. Camera 300 is substantially identical to camera 10 and includes a lighttight housing formed by sections 302, 304, 306, 308, 309, (only one of which is shown) and a rangefinder-viewfinder 310. Section 302 includes an inner frame member 312 for supporting a film assemblage 314 in position for exposure of the forwardmost film unit or photosensitive element located within the assemblage, a drawer 316 mounted for reciprocating movement, an outer frame member 318 and a closure member 320 having side walls 322 (only one of which is shown).

A cam and cam follower arrangement, similar to that previously described is provided for moving closure member 320 away from the remainder of section 302 in order to generate a storage chamber 324 for receiving exposed film units or photosensitive elements. Each side wall 322 of closure member 320 is provided with a pair of longitudinally spaced cam followers 325 and 327. Cam followers 325 and 327 are adapted to cooperate with longitudinally spaced cams 326 and 328 which are pivotally mounted about the axes of pins 330 and 332 which are in turn rotatably supported by a fixed portion of the camera. Each set of cams 326 and 328 are connected to each other by a link 334 and laterally spaced cams are connected to each other by pins 330 and 332 for synchronizing pivotal movement of the four cams 326 and 328. A slidably mounted button 336 is located along one side of section 309 for pivoting the cams 326 and 328 from the broken line position to the solid line position to generate storage chamber 324. Button 336 is connected to a link guide 338 by a rod 340 which extends through an elongated slot 342 in section 309. Link 334 extends through a vertical slot 344 in guide 338 and is retained in engagement therewith by a pair of washers 346 and 348 which are fixedly attached to link 334. The vertical slot 344 enables link 334 to have a component of movement in the vertical direction as the button 336 is moved to the left (as viewed in FIG. 12) to decrease the volume of the storage chamber 324 as the camera moves into its operative configuration shown in solid lines and to the right to generate the storage chamber 324. Biasing means similar to those described with reference to the embodiment shown in FIGS. 1-11 are provided for urging closure member 320 toward outer frame member 318 thereby providing the camera with a minimum overall volume when the camera is not in use.

A normally open switch 333 is provided in the camera's circuit between the camera's motor and the film advancing apparatus, rolls 350 and 352 and drawer 316 for insuring that the storage chamber 324 has been generated before a film unit is moved from the exposure position. When the camera is in the position shown in solid lines in FIG. 12, cam 326 maintains switch 333 in a closed condition thereby allowing normal operation of the camera. However, when the camera is not in the erected position, cam 326 is out of engagement with switch 333 thereby allowing switch 333 to open to prevent operation of the film advancing apparatus, rolls 350 and 352 and drawer 316. In this manner the user still captures the scene which he wanted to record on film but the exposed film unit will not be moved out of the exposure position until storage chamber 324 has been generated. When the user notices that the drawer 316 has not moved in a reciprocating manner he will realize that button 336 has to be moved to the solid line position shown in FIG. 12 in order to process the exposed film unit.

From the foregoing it can be seen that there has been disclosed an arrangement of parts which cooperate to generate a storage chamber for receiving exposed photosensitive elements. The cooperation between the various parts is such that the volume of the storage chamber is at a maximum when the camera is in use and, when not in use, is adapted to be reduced to that which is just sufficient to house the precise number of photosensitive elements contained therein thereby enhancing the compactness of the camera.

Since certain changes may be made in the above apparatus without departing from the scope of the invention herein involved, it is intended that all matter contained in the above description or shown in the accompanying drawings shall be interpreted as illustrative and not in a limiting sense.

What is Claimed is:

1. In a camera of the type wherein a plurality of photosensitive elements are adapted to be sequentially exposed, processed and individually viewed between exposures, the improvement comprising:
   means for varying the space enclosed by said camera in order to provide a storage chamber for accommodating selected numbers of exposed photosensitive elements for storage within said camera; and
   means for transporting exposed photosensitive elements sequentially from an exposure position to said storage chamber.

2. The improvement according to claim 1 wherein said camera has an erected and a stored configuration, said means for varying the space being adapted to increase the available space within said storage chamber a predetermined amount when said camera is in an erected configuration, said means for varying the space responding to the precise number of exposed photosensitive elements requiring storage to provide only sufficient space within said storage chamber necessary to accommodate the precise number of exposed photosensitive elements requiring storage when said camera is in a stored configuration.

3. The improvement according to claim 2 and further including erecting means for moving operative portions of said camera into an operative configuration, said erecting means including links connecting operative portions of said camera and further including means coacting with said links for moving a wall of said camera into an expanded condition thereby increasing the space available for photosensitive element storage within said camera.

4. The improvement according to claim 3 wherein said last-mentioned means includes cam means operative with at least one of said links and acting against said means for varying the space during camera erection to provide additional space within said camera for the storage of exposed photosensitive elements.

5. The improvement according to claim 4 wherein said erecting means includes gear means, a portion of said gear means being carried by at least one of said links and another portion of said gear means being carried by a relatively fixed portion of said camera, said gear means being operative to drive said cam means into said means for varying the space as said camera is erected.

6. The improvement according to claim 1 and further including means for moving unexposed photosensitive elements into an exposure position within said camera wherein individual photosensitive elements are sequentially exposed.

7. The improvement according to claim 6 wherein said means for moving includes a container carrying a plurality of photosensitive elements in stacked relationship and biased toward one wall of said container so that a succession of photosensitive elements are presented for exposure as a given photosensitive element is exposed and removed from the exposure position.

8. The improvement according to claim 7 wherein said means for transporting includes means for protecting the exposed photosensitive elements during movement thereof.

9. The improvement according to claim 8 wherein said means for varying includes a movable wall portion and biasing means, said wall portion being thereby biasedly mounted and adapted to move relative to the main body of said camera to provide said storage chamber for exposed photosensitive elements.

10. The improvement according to claim 1 and further including erecting means for said camera cooperating with said means for varying the space to alter the geometry of said camera from a stored condition to an operative condition, said means for varying the space responding to movement of said erecting means to selectively provide a storage chamber within said camera of sufficient size to store all of the plurality of photosensitive elements after sequential exposure thereof.

11. The improvement according to claim 10 wherein said erecting means includes links pivotably carried by said camera and engaging operative portions of said camera whereby the operative portions of said camera are relatively positioned in space so that said camera is in an operative, erected position.

12. The improvement according to claim 11 wherein said erecting means includes cam means and said means for varying the space includes cam follower means, said cam means cooperating with said cam follower means to drive said means for varying the space into a position where a maximum volume is provided for said storage chamber within said camera for storage of exposed photosensitive elements.

13. The improvement according to claim 12 and further including sector gear means, a portion of said sector gear means being carried by a fixed portion of said camera and a portion being carried by said erecting means, the portion of said sector gear means carried by said erecting means pivoting the portion of the sector gear means carried by said fixed portion to drive said means for varying into an expanded disposition whereby said cam means acts against said cam follower means to move said means for varying the necessary distance to provide a volume for said storage chamber at least large enough to store all of the photosensitive elements available for exposure.

14. The improvement according to claim 13 wherein said means for varying includes a wall portion of said camera movable from a first position to a second position as said camera moves between said stored and operative conditions, whereby the volume of said storage chamber formed within said camera is changed to receive a number of exposed photosensitive elements for storage.

15. The improvement according to claim 1 wherein said means for transporting the exposed photosensitive elements includes reciprocable means for transporting an exposed photosensitive element from an exposure position to another position within said camera.

16. The improvement according to claim 15 and further including erecting means for positioning various components of said camera into an operative configuration, said erecting means including means cooperating with said means for varying the space to increase the available space within said camera for storage of exposed photosensitive elements.

17. The improvement according to claim 16 wherein said means for varying the space includes cam follower means and said erecting means includes cam means cooperating with said cam follower means to increase the space available within said storage chamber for storage of exposed photosensitive elements.

18. The improvement according to claim 17 wherein said camera includes a portion housing the major operative components and a movable wall portion connected thereto by spring means, said spring means cooperating with said movable wall portion to change the volume of said storage chamber from a fixed volume when said camera is in an erected condition to a second volume which responds to the precise number of exposed photosensitive elements requiring storage when said camera is in the stored condition.

19. The improvement according to claim 18 wherein said means for varying includes a wall portion of said camera movable from a first position to a second position as said camera moves between said stored and operative conditions whereby the volume of said storage chamber is altered to receive a number of exposed photosensitive elements for storage, said movable wall portion being resiliently biased into a condition wherein the volume of said storage chamber is held to the minimum necessary to house the precise number of exposed photosensitive elements requiring storage.

20. In a camera of the type wherein a plurality of photosensitive elements are adapted to be sequentially exposed, processed and individually viewed between exposures, the improvement comprising:
   means for increasing the space enclosed by said camera in order to provide a storage chamber of preselected volume for accommodating exposed photosensitive elements; and
   means for decreasing said preselected volume to one which is just sufficient to accommodate the precise number of photosensitive elements contained therein.

21. The improvement according to claim 20 wherein said camera is adapted for movement between an erected, configuration and a stored configuration, said means for increasing being adapted to increase the volume of said storage chamber to said preselected volume as said camera assumes said erected configuration.

22. The improvement according to claim 21 wherein said means for decreasing is adapted to decrease said preselected volume as said camera assumes said stored configuration.

23. The improvement according to claim 22 wherein said camera includes erecting means for moving sections of said camera between said erected and stored configurations, said erecting means cooperating with said means for increasing to increase the volume of said storage chamber as said camera assumes said erected configuration.

24. The improvement according to claim 20 wherein said camera is of the non-folding type.

25. The improvement according to claim 24 further including means for advancing an exposed photosensitive element from an exposure position within said camera to said storage chamber.

26. The improvement according to claim 25 further including means for preventing operation of said means for advancing when said storage chamber has not attained said preselected volume.

27. The improvement according to claim 26 wherein said means for preventing includes normally open switch means.

28. The improvement according to claim 27 wherein said switch means is adapted to be engaged and closed by said means for increasing to permit operation of said means for advancing when said storage chamber has attained said preselected volume.

* * * * *